United States Patent
Stahle et al.

(10) Patent No.: US 7,144,180 B2
(45) Date of Patent: Dec. 5, 2006

(54) DEVICE FOR RELATIVE FIXING OF ELEMENTS TELESCOPICALLY DISPLACED IN EACH OTHER

(75) Inventors: Ragnar Stahle, Svalortsvagen 5, S-459 32 Ljungskile (SE); Lill-Hege Hagensen, Ljungskile (SE)

(73) Assignee: Ragnar Stahle, Ljungskile (SE)

( * ) Notice: Subject to any disclaimer, the term of this patent is extended or adjusted under 35 U.S.C. 154(b) by 0 days.

(21) Appl. No.: 10/362,767

(22) PCT Filed: Aug. 31, 2001

(86) PCT No.: PCT/SE01/01856

§ 371 (c)(1),
(2), (4) Date: Feb. 24, 2003

(87) PCT Pub. No.: WO02/18802

PCT Pub. Date: Mar. 7, 2002

(65) Prior Publication Data

US 2004/0047682 A1    Mar. 11, 2004

(30) Foreign Application Priority Data

Sep. 3, 2000    (SE) .................................... 0003117

(51) Int. Cl.
*B25G 1/00*    (2006.01)

(52) U.S. Cl. ............... 403/109.1; 403/109.7; 403/374.1; 403/374.2; 403/377; 15/144.1; 15/144.3; 15/144.4; 16/429

(58) Field of Classification Search ............. 403/109.1, 403/109.7, 374.1, 374.2, 374.5, 377; 248/410, 248/412; 294/19.1, 19.2; 16/405, 429, 436; 15/143.1, 144.1, 144.2, 144.3, 144.4, 210.1
See application file for complete search history.

(56) References Cited

U.S. PATENT DOCUMENTS 2,658,777 A * 11/1953 Rauglas ...................... 403/104
2,703,691 A * 3/1955 Minnis ........................ 248/412
4,706,916 A * 11/1987 Cullmann et al. .......... 248/168

FOREIGN PATENT DOCUMENTS

| CH | 622 421 | * | 7/1977 |
|---|---|---|---|
| DE | 3143793 | | 5/1983 |
| EP | 0209756 | | 1/1987 |
| GB | 2 241 995 | * | 9/1991 |
| SE | 8203018-0 | | 6/1983 |
| SE | 8703876 | | 4/1989 |

* cited by examiner

*Primary Examiner*—James M. Hewitt
*Assistant Examiner*—Michael P. Ferguson
(74) *Attorney, Agent, or Firm*—Rolf Fasth

(57) ABSTRACT

A locking device for two units (1), (3) displaceable one inside the other, such as the handle of an implement with variable length, comprising a locking member (4) arranged at one end of the outer element (3), said locking member (4) being operated by an operating member (5) spaced from the locking member (4) in the direction of the other end of the outer element (3) via an actuating member (7) that is displaceable along, or turnable about, an axis parallel with the longitudinal axis of the outer element (3).

3 Claims, 16 Drawing Sheets

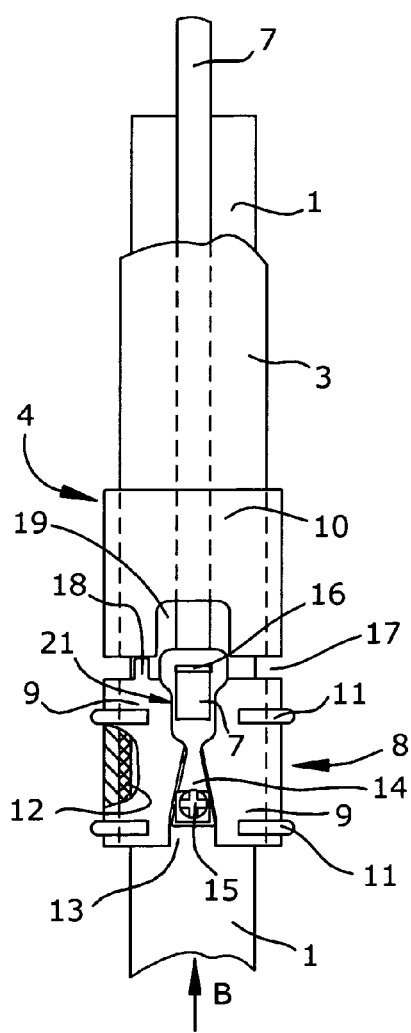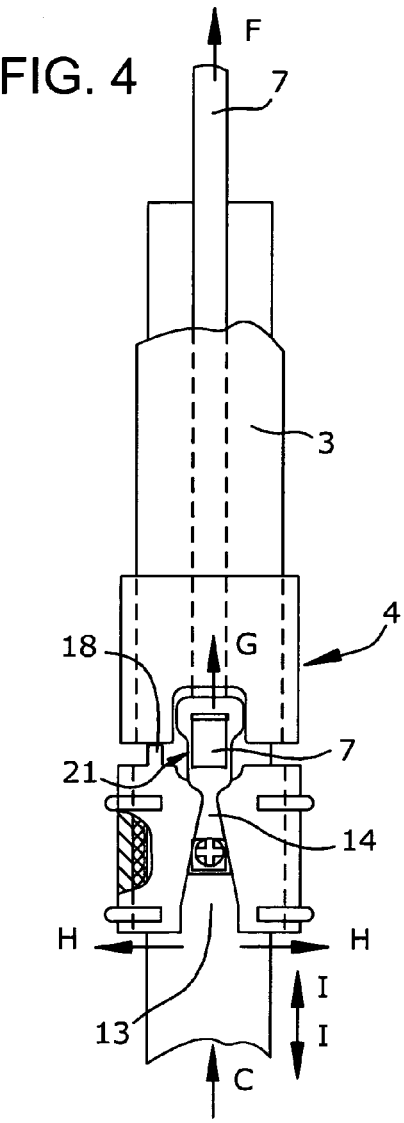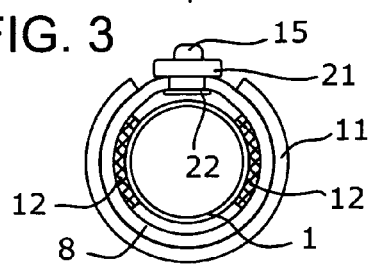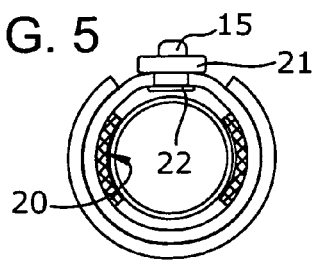

FIG. 10
FIG. 11
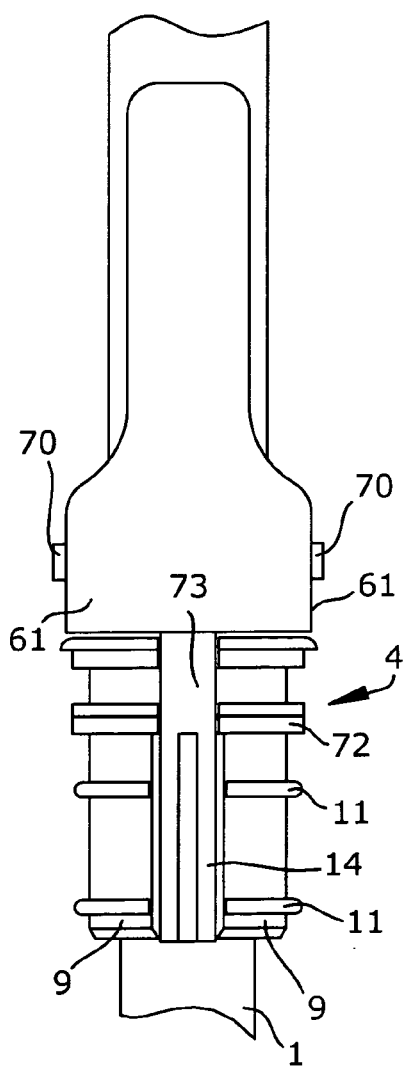
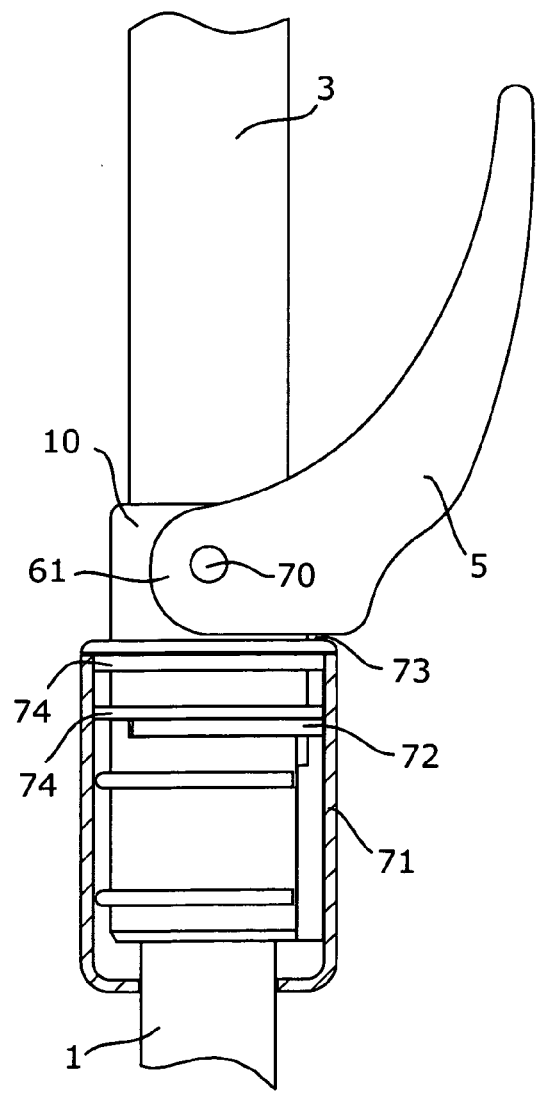

FIG. 13
FIG. 14
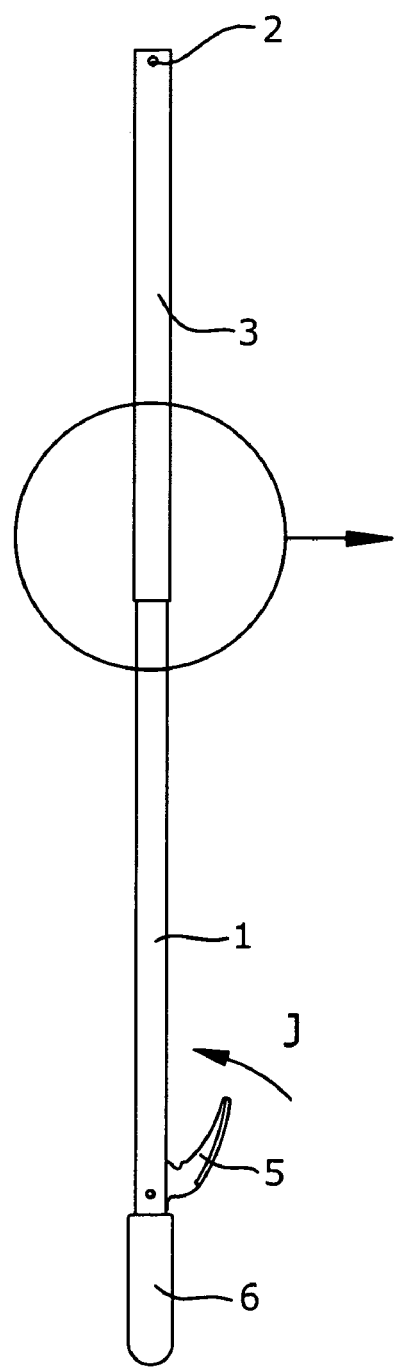
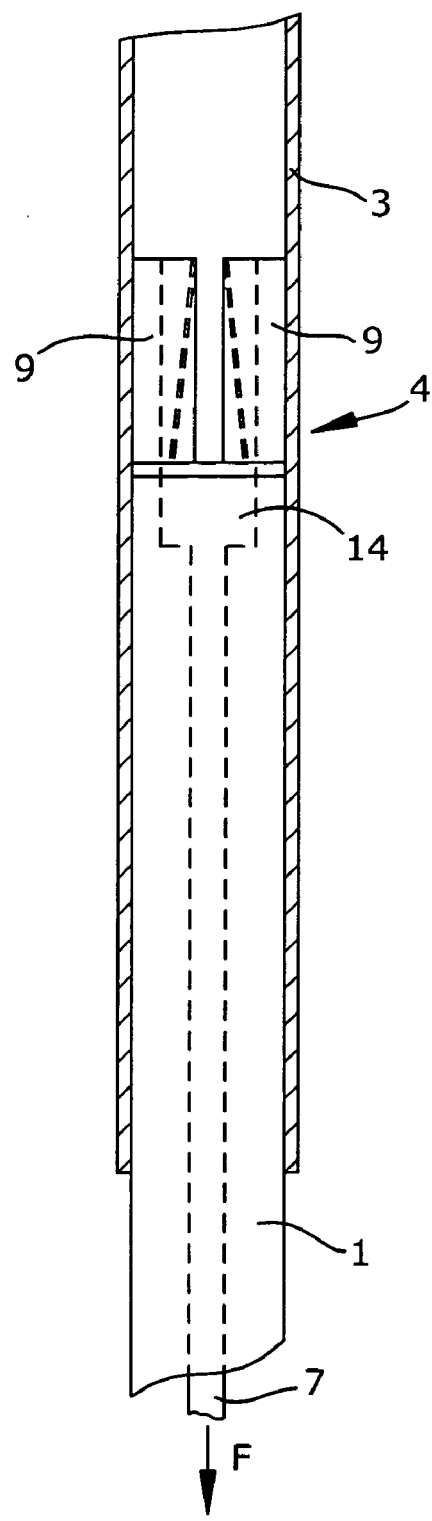

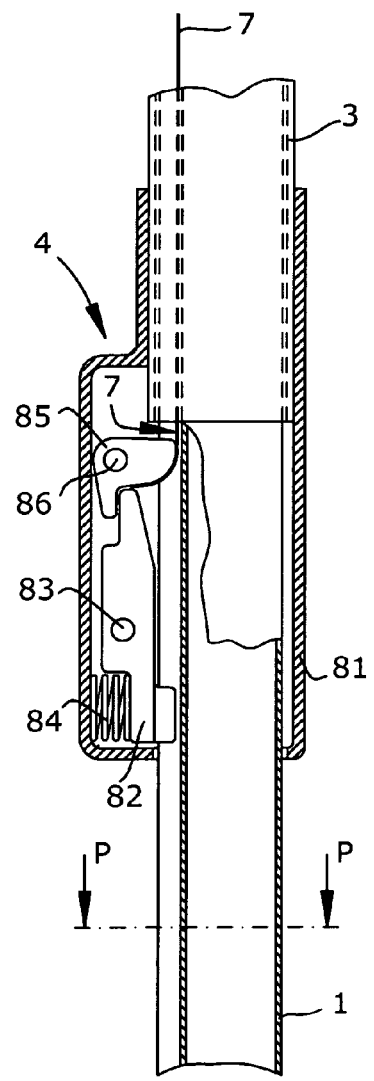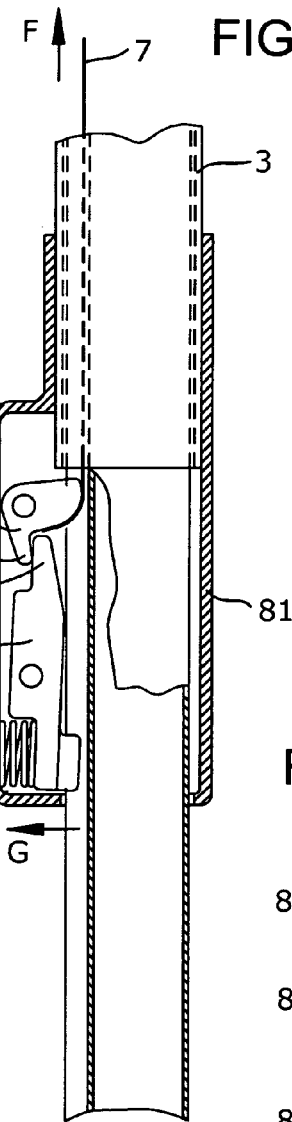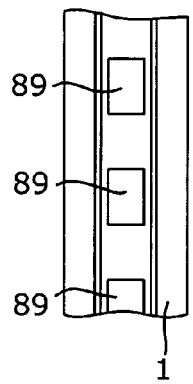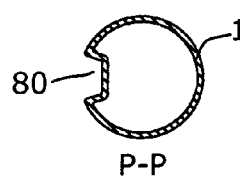

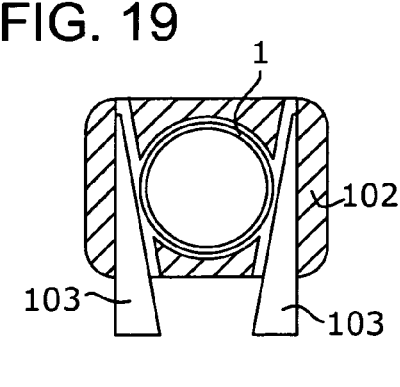
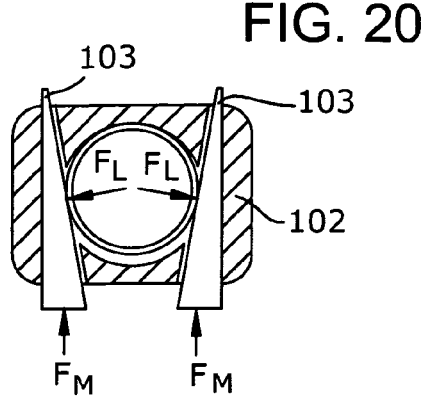
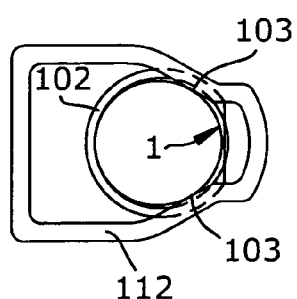
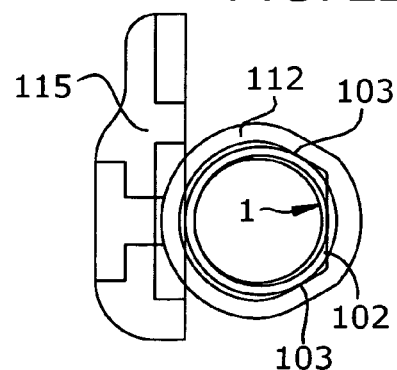
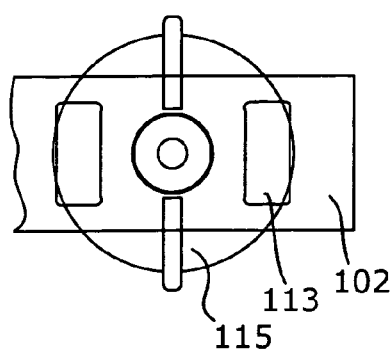
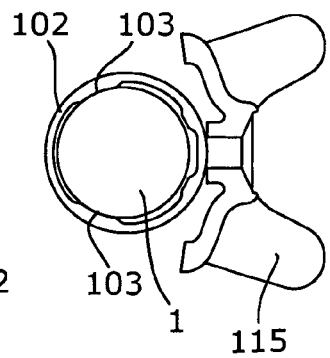
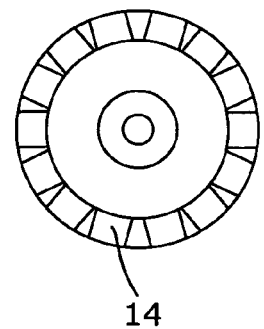

A-A

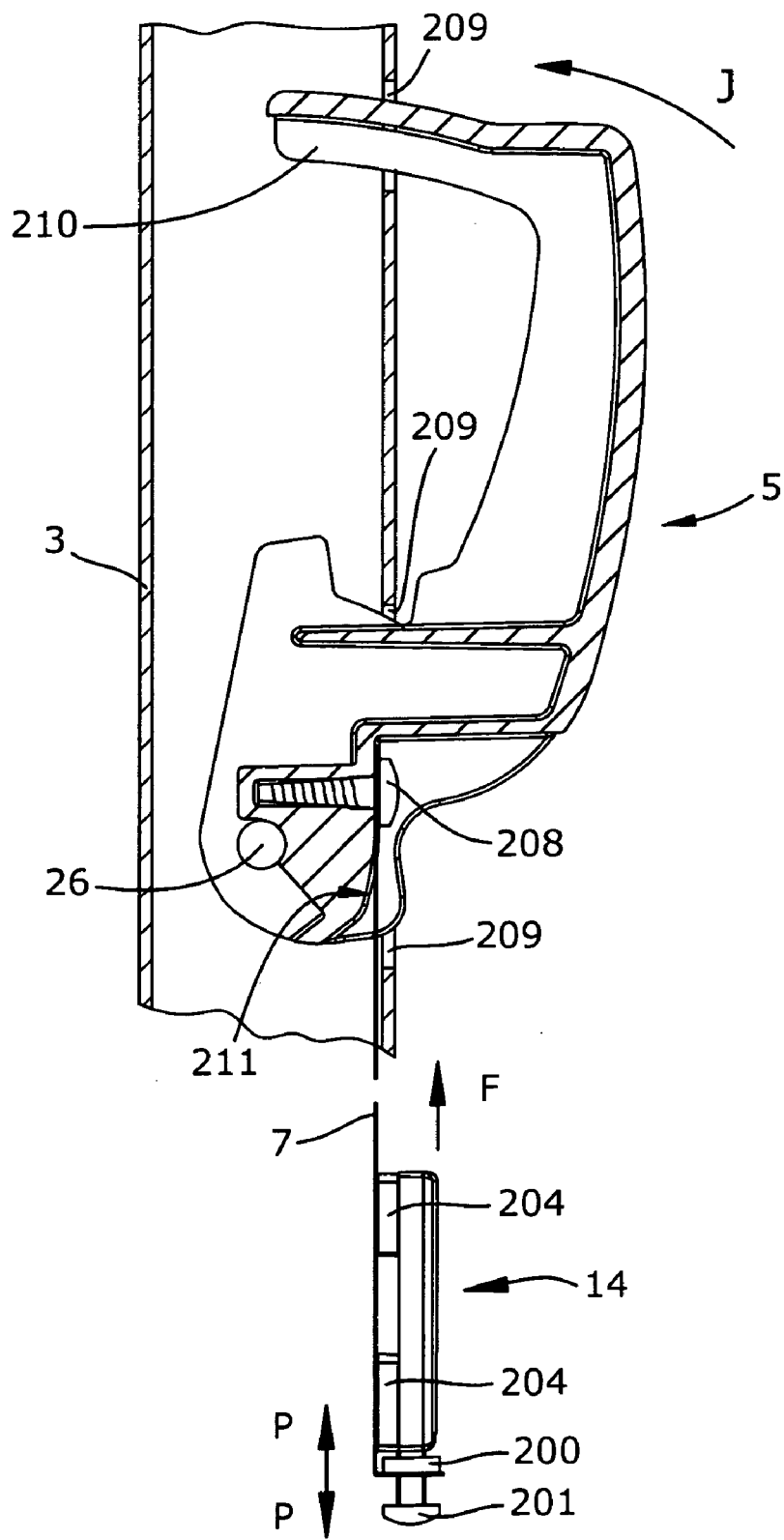

DEVICE FOR RELATIVE FIXING OF ELEMENTS TELESCOPICALLY DISPLACED IN EACH OTHER

This is a U.S. national phase patent application that claims priority from PCT/SE01/01856, filed 31 Aug. 2001, that claims priority from Swedish Patent Application No. 0003117-9, filed 3 Sep. 2000.

TECHNICAL FIELD

The invention relates to a device for detachably locking two elements in an optional position in relation to each other, said elements being telescopically or turnably movable in relation to each other with a certain clearance between the two elements, such as a rod or pipe within an outer rod or within an outer sleeve.

BACKGROUND ART

Many types of devices for detachably locking two telescopically movable elements in relation to each other are known, such as simple screw joints, cotter and hole joints, wedge joints, conical ring joints, eccentric joints, etc. These devices exhibit different properties and drawbacks. Cotter and hole joints and other shape-dependent joints (e.g. SE 870387-6) provide a secure connection but only allow stepwise adjustment of the elements in relation to each other. Other joints such as screw joints, are dependent on friction and thus allow stepless setting, but they often require such high contact forces to ensure reliable locking that the contact surfaces become deformed.

SE 8203018-0 describes a device with an intermediate element 8 to spread the contact force over a larger area with the object of avoiding damage to the contact surfaces. A drawback with this device, however, is that the locking force is so great that a screw must be used, which is an inconvenience.

EP 0209756 describes a device in which a rubber ring 4 having circular cross section is used as a locking and sealing element. A drawback with this device, however, is that setting the two elements in relation to each other is complicated since the joint must be opened and the rubber ring rolled to the desired position.

DE 3143793 describes a device in which a plastic washer 40 with a conical end piece is clamped between corresponding conical surfaces on the outer and inner telescopic elements. A drawback with this, however, is that the fit between the inner telescopic element and the washer must be so accurate that it is rather difficult to move it along the inner telescopic element. Another drawback is that the washer is thus subject to wear.

Common to these known solutions is that they are generally operated by movement of the operator's hand and that the operation cannot be performed at a distance from the locking unit. In the use of telescopically adjustable handles for implements, such as cleaning handles, particularly cleaning handles for floor care such as floor mops it is, for ergonomic reasons, extremely necessary to be able to operate the telescopic function from the upper part of the handle, without the need for any turning movement. From the ergonomic aspect it is most advantageous if control can be performed by means of pressure close to the upper part of the handle, at right angles to the longitudinal axis of the handle, and for the application of this pressure via a compressive movement of the operator's hand to give rise to release of the locking device.

DESCRIPTION OF THE INVENTION

The main object of the present invention is to provide an easily operated but, at the same time, extremely reliable device for stepless and detachable locking of two elements that are telescopically or turnably movable in relation to each other. The device shall be usable in widely differing technical areas where the stop positions between two elements must be changed. The device is primarily intended for the handles of implements such as cleaning handles, particularly cleaning handles for floor care, such as floor mops. Other feasible areas of application are e.g. sports equipment, stands, masts and frames.

Another object of the present invention is to provide a device that permits adjustment of the position between the inner and outer elements via a control spaced from the locking device.

Another object of the present invention is to provide a device that allows repeated, reliable locking of a desired position between the inner and outer elements without any function-impairing influence or wear occurring on the parts involved.

Yet another object of the present invention is to provide a device that allows adjustment of the position between the inner and outer elements without the need for any turning movement.

These objects are achieved by means of a device for detachably locking two elements in an optional position, said elements being telescopically or turnably movable in relation to each other with a certain clearance between the two elements, such as a rod or pipe within an outer rod or within an outer sleeve, comprising a locking device operated by means of an operating member spaced from the locking device, via an actuating member.

The invention will be described in more detail with reference to the accompanying drawings, the latter being intended to explain and not to limit the invention.

BRIEF DESCRIPTION OF THE DRAWINGS

FIG. 2 is a partial view, partly in cross-section, in the direction of the arrow A in FIG. 1, showing mostly the locking device, in locked position.

FIG. 3 is a view B of the device as shown in FIG. 2

FIG. 4 is a view of the device as shown in FIG. 2, when disconnected.

FIG. 5 is a view C of the device shown in FIG. 4.

FIG. 10 is a partial view from the front of an embodiment of the invention where the actuating member is omitted.

FIG. 11 is a partial view from the side, partly in cross-section, of the device shown in FIG. 10 in which the device is in a locked position.

FIG. 13 is a side view from the device where the inner element is turned to face the operator.

FIG. 14 is a cross-sectional view of the locking member of the device shown in FIG. 13.

FIG. 15 is a cross-sectional view of another embodiment of the device of the present invention with a locking wedge pressed against wedge-shaped grooves in the inner element.

FIG. 16 is a cross-sectional view of the embodiment, shown in FIG. 15, in which the device is in an unlocked position.

FIG. 17 is cross-sectional top view of the inner element as shown in FIGS. 15 and 16.

FIG. 18 is a partial side view of an inner element where a number of rectangular holes are arranged in an axially directed recess.

FIG. 19 is a cross-sectional top view of a locking member in an unlocked position.

FIG. 20 is a cross-sectional top view of the locking member, shown in FIG. 19, in a locked position.

FIG. 21 is a cross-sectional view of a locking member having a tangentially displaceable locking yoke that can act on the surface of the inner element.

FIG. 22 is a cross-sectional view of the locking member shown in FIG. 21, where the locking yoke is operated by a knob.

FIG. 23 is a partial view from the front of a locking member with a knob acting on the inner element via recesses in the outer element.

FIG. 24 is a partial view of the locking member shown in FIG. 23.

FIG. 25 is a rear view of a contact surface of the knob.

FIG. 46 is a view of operating member, actuating member and the wedge in an assembled position.

DETAILED DESCRIPTION

Figure 1:
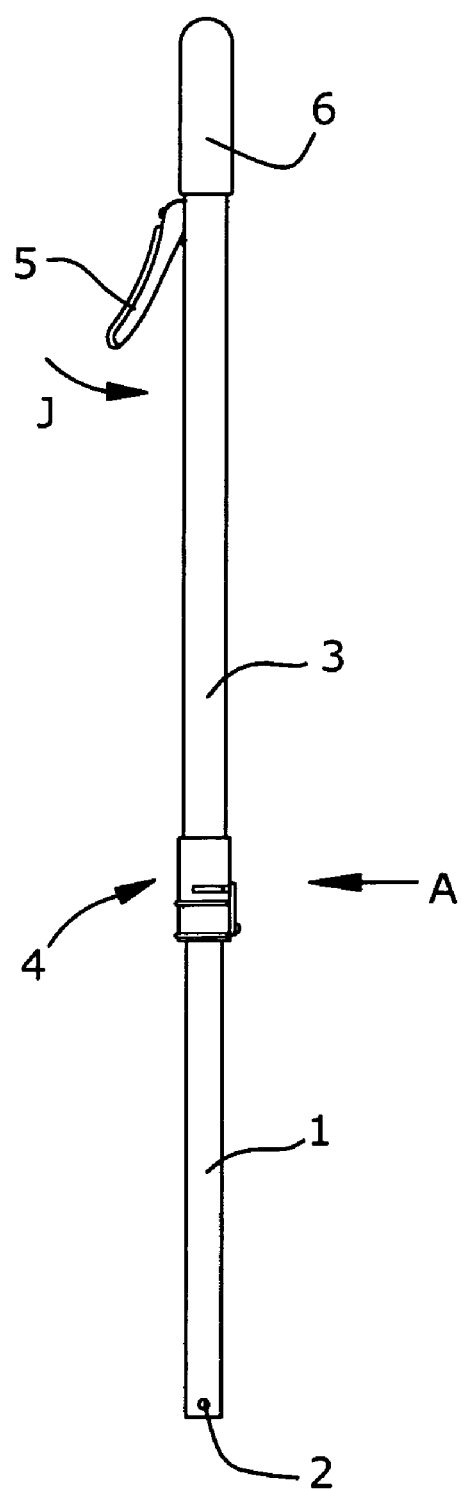
FIG. 1 is a view from the side showing the handle of an implement with a device in accordance with the invention.

The device shown in FIG. 1 is the handle of an implement comprising an inner element 1 with hole 2 for attachment of a suitable implement. The inner element 1 is fitted into an outer element 3 with a certain clearance. In this case the inner and out elements 1 and 3, respectively, are tubular with suitable diameters and are thus turnable in relation to each other. The inner element 1 is detachably locked to the outer element 3 with the aid of a locking member 4. When not actuated the locking member 4 is locked by spring elements, the function of which will be further explained later in the description. A handle is fitted over the top of the outer element 3, below which an operating member 5 is turnably attached. Compression of the operating member 5 in the direction of the arrow J releases the locking device 4 and the inner element 1 can then be turned and displaced in relation to the outer element 3. It is thus possible to adjust the handle of the implement to the desired length and also to turn the implement to the desired angle without the operator having to bend down. In practice adjustment of the handle is effected by the operator moving his/her hand down from the gripping handle 6 and pressing the operating member 5 towards the outer element 3. Thanks to the placing of the operating member 5 in the upper part of the handle of the implement, the operator need not bend his/her wrist during operation. Furthermore, only one hand is required for the adjustment since, upon compression of the operating member 5 in the direction of the arrow J, the hand will also grip the outer element 3. The properties described above are of great benefit to those who frequently use such implements with handles. One such occupational category is cleaning staff who spend most of their working hours using cleaning handles, the length of which must frequently be adjusted.

The device in accordance with the invention consists of three logical units: the locking member, the operating member, and an actuating member therebetween via which actuation of the operating member is transmitted to the locking member. One of the aims of the invention has been to achieve reliable locking with small operating force and short operating distance. This aim is achieved with an embodiment of the locking device as shown in FIGS. 2 and 3. The locking member 4 here consists of a partially slotted rod, suitably of reinforced plastic, which is whole at the top and forms an attachment collar 10, the latter being permanently connected to the outer element 3. The lower part 8 of the rod is partly separated from the upper part by a slot 17, the depth of the slot being such that a relatively narrow neck connects the upper part 10 and the lower part 8. The lower part 8 is cleft in axial direction by a wedge-shaped groove 13 and thus forms two jaws 9 that are radially displaceable. Friction pads 12 are fixed on the inside of these jaws 9, the pads being shaped to the envelope surface of the inner element. These friction pads 12 may suitably be made of rubber and can be taped to the inside of the jaws 9, or of a rubber profile with ridges that can be inserted into corresponding grooves in the jaws 9 (not shown in the drawing). The jaws 9 are pressed with relatively strong force by the spring elements 11 against the inner element 1 which is thus locked against the outer element 3 via the friction pads 12. A wedge 14 fits into the groove 13 and is in connection with an actuating member 7. This wedge 14 slides against the opposing edges in the groove 13. The angle between these edges is so large that self-locking of the wedge cannot occur and, when not actuated by the operating member 5, this wedge 14 is always in the lower position as shown in FIG. 2. FIGS. 4 and 5 show the locking device 4 when disconnected. Under the influence of an operating force from the operating member 5 the actuating member 7 is drawn in the direction of the arrow F. The wedge 14 is thus drawn in the direction of the arrow G into the groove 19 in the attachment collar 10. This groove 19 also runs through the outer element 3 so that the wedge 14 can be freely drawn in the direction of the arrow G. The wedge-shaped groove 13 is thus separated in tangential direction as indicated by the arrows H. A small gap thus appears between the friction pads 12 and the inner element 1 so that this can easily be displaced in relation to the outer element 3 in the direction of the arrows I, and can also be rotated. Under the influence of the operating force the lower part 8 tends to bend and must therefore be support by a peg 18 in the slot 17. Said peg 18 is rigidly attached to one of the jaws 9 and, during the operation, slides against the edge of the attachment collar 10. The wedge 14 is provided with internal and external guiding edges 22, 21, respectively, which keep the wedge in place in the groove 13. For the sake of clarity the lower part of the external guiding edge 21 is not shown in FIGS. 2 and 4. Operation of the locking member 4 is thus performed via an actuating member 7. The actuating member 7 preferably comprises a thin tape for which there is room in the narrow tap between the inner element 1 and the outer element 3, which is extremely advantageous. The tape may be made of high-quality reinforced plastic, but is preferably made of high-strength spring steel which is commercially available in desired widths down to a thickness of 0.2 mm. The advantages of such a steel tape are that it is strong and flexible but relatively inelastic upon tensile stress. The steel tape is bent perpendicularly outwards, fitted into a through-slot 16 in the wedge 14 and bent downwards on the upper side of the wedge 14. A through-hole is provided at the lower end of the steel tape, into which the attachment screw 15 is fitted and screwed into the wedge 14. The spring elements 11 preferably consist of rings of spring steel which are standard products. The advantages of this type of spring element are that they produce a compact construction and that they enclose the jaws, thereby supporting the jaws 9 along the entire envelope surface below which the friction pads 12 are secured. The friction pads 12 can thus be pressed against the inner element 1 from a long time without causing any deformation in the jaws 9 that might impair the locking function.

Figure 6:
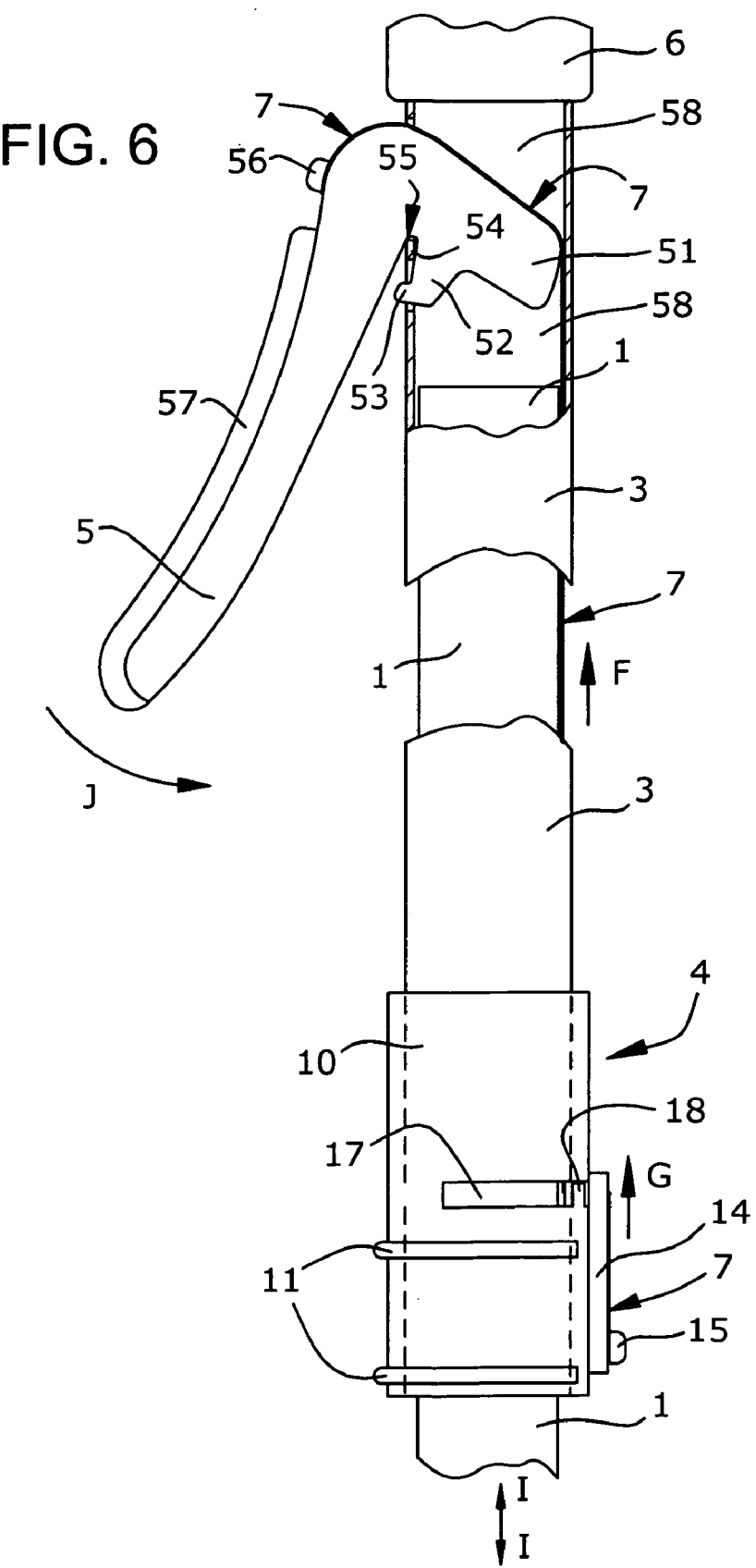
FIG. 6 is a partial view, partly in cross-section, showing mostly the operating member.

FIG. 6 shows a view, partly in cross-section, of a preferred embodiment of the invention. To save space the outer element 3 is shortened here and the operating member 5 is therefore a shorter distance from the locking member 4 than is shown in FIG. 1. The tongue 51 of the operating member 5 fits into slots in the outer element. This tongue 5 is considerably narrower than the inner diameter of the outer rod and is provided with a groove 55 riding on a lower edge 54 of the upper groove of the outer element 3. The operating member 5 can thus be turned around the edge 54 in the direction of the arrow J. During this rotation the portion 52 is moved in towards the free space 58 inside the outer element 3 and forms a stop against the upper edge of the inner element so that this cannot prevent rotation due to wedging. For the same reason the portion 52 comprises an outwardly directed shoulder 53 which, when the operating member is inactive, protrudes through a lower slot in the outer element 3. When the operating member 5 is turned towards its stop position the shoulder 53 is in such a position that it stops the inner element 1 so that this cannot prevent rotation by wedging. The operating member 5 also comprises a wider grip 57 for comfortable operation. The actuating member 7 is attached in the operating member and in this embodiment is in the form of a steel tape screwed to the operating member by means of the screw 56. The steel tape rests against the edge of the operating member 5 and follows this edge in towards the innermost edge of the tongue 51, shaped with a radius. When the operating member 5 is compressed in the direction of the arrow J, the tongue 51 is rotated upwards towards the gripping handle 6. The steel tape is thus pulled in the direction of the arrow F and the wedge 14 in the direction of the arrow G. The inner element 1 is thereby disconnected from the outer element 3 and can be freely displaced and rotated in relation thereto without being impeded by the actuating member 7 since this is so narrow that it only marginally fills the gap between the inner and outer elements 1 and 3, respectively. Practical tests have shown that if the operating member 5 is actuated with a compressive force of 25 N for an operating distance of 30 mm, an extremely reliable locking function can be released, thereby resulting in very convenient operation for the operator. Instead of hooking the operating member in the edge 55 of the outer element 3 it would also be possible to store the tongue 51 of the operating member 5 in a shaft running through the hollow in the center of the outer element 3. This results in a smaller lever and the angle of rotation will be correspondingly greater.

Figure 7:
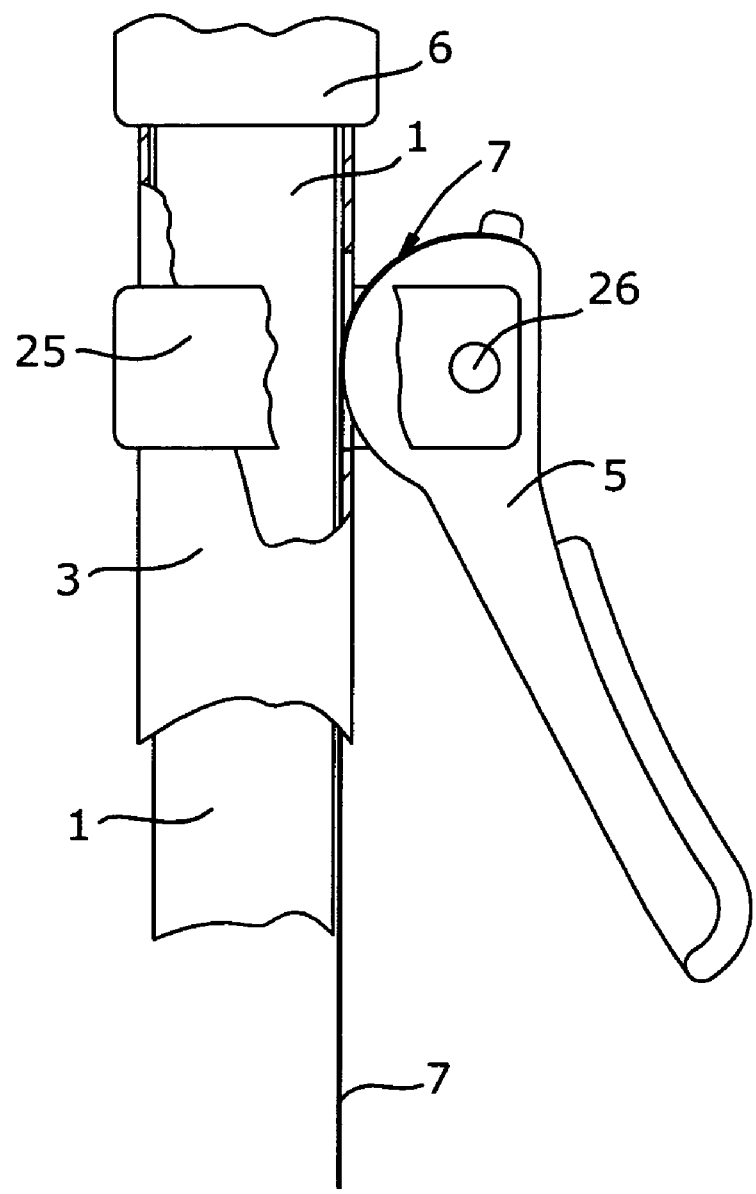
FIG. 7 is a partial view, partly in cross-section, showing primarily the operating member in an alternative embodiment.

FIG. 7 shows an embodiment of the operating member 5 having the advantage of not intruding into the outer element 3 and therefore not stopping the inner element 1, which can thus be freely pushed past the operating member 5 to the desired position. The operating member 5 is here turnably journalled in a yoke 25 via the axis 26. The yoke 25 partially surrounds the outer element 3 and is rigidly connected thereto. The actuating member 7 protrudes through a slot 27 in the envelope surface of the outer element 3.

Figure 8:
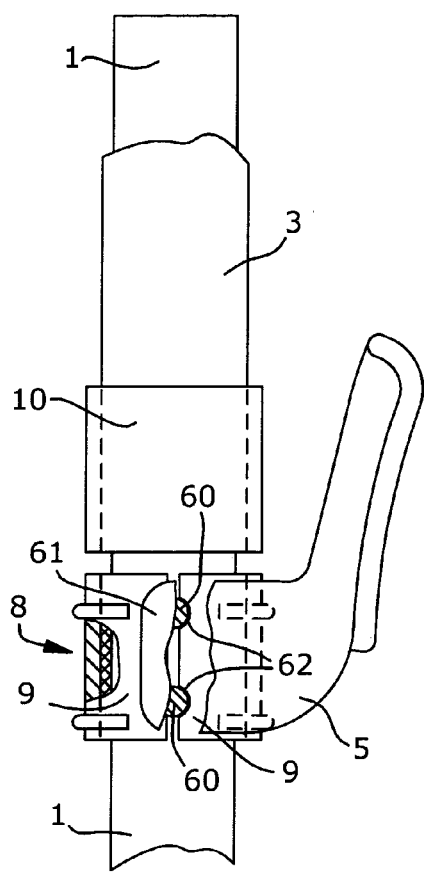
FIG. 8 is a partial view, partly in cross-section, showing a locking device and an operating member without intermediate actuating member, in locked position.
Figure 9:
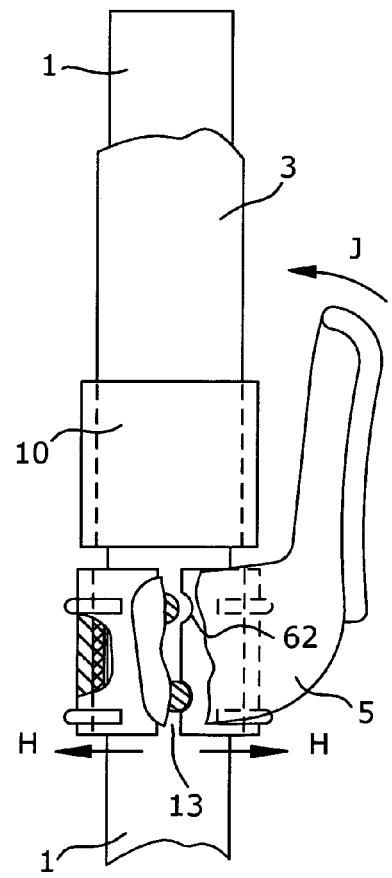
FIG. 9 is a partial view, partly in cross-section, showing a device as shown in FIG. 8, when disconnected.

FIGS. 8 and 9 show an embodiment of the invention in which the actuating member 7 is omitted. The operating member 5 comprises a U-shaped section partially surrounding the locking member 4 with two flanges 61, two circular pins 60 being attached on the inside of one of the flanges. A pin is rigidly attached on the inside of the opposite flange, on a level exactly between the pins 60, fitted into corresponding holes in the rear of the lower part 8. This opposing pin, which is thus hidden in the figures, defines the center of rotation upon compression of the operating member 5. Pins 60 are fitted into corresponding semicircular grooves 62 in opposing edges of both jaws 9. Under the influence of a compressive movement of the operating member 5 in the direction of the arrow J, the wedge-shaped groove 13 is separated in tangential direction in the direction of the arrows H. A small gap thus appears between the friction pads 12 and the inner element 1, whereupon this can easily be displaced in relation to the outer element 3 in the direction of the arrows I, and can also be rotated. This embodiment has the advantage of being cheaper to manufacture and gives an very reliable and easily operated disconnection if operation need not occur at a distance from the locking member.

In the above description the invention has been applied to the handle of an implement. However, it can naturally be applied in all areas in which elements need to be telescopically displaced and rotated in relation to each other. The same inventive concept, with an operating member placed at a distance from the locking device, can be applied to other types of locking members than those described above.

However, it is preferable for the locking device to be locked under influence of the spring element. The desired displacement of the jaws 9 may also be achieved in many other ways besides those described above. In the above description the jaws 9 are connected by a neck to an attachment collar 10. However, the jaws 9 can naturally be displaceably attached to the outer element 3 in some other way, e.g. they may consist of separate parts inserted into rectangular grooves in the outer element 3, or made in one piece with the outer element. The spring elements 11 may, furthermore, be designed in widely different ways and still give the same compressive function. The invention has been described above as applied to rods and pipes with circular cross section. The same inventive concept can naturally also be applied to rods and pipes with other cross sections, e.g. rectangular. The invention can also be varied within the scope of the claims in ways obvious to one skilled in the art.

Figure 12:
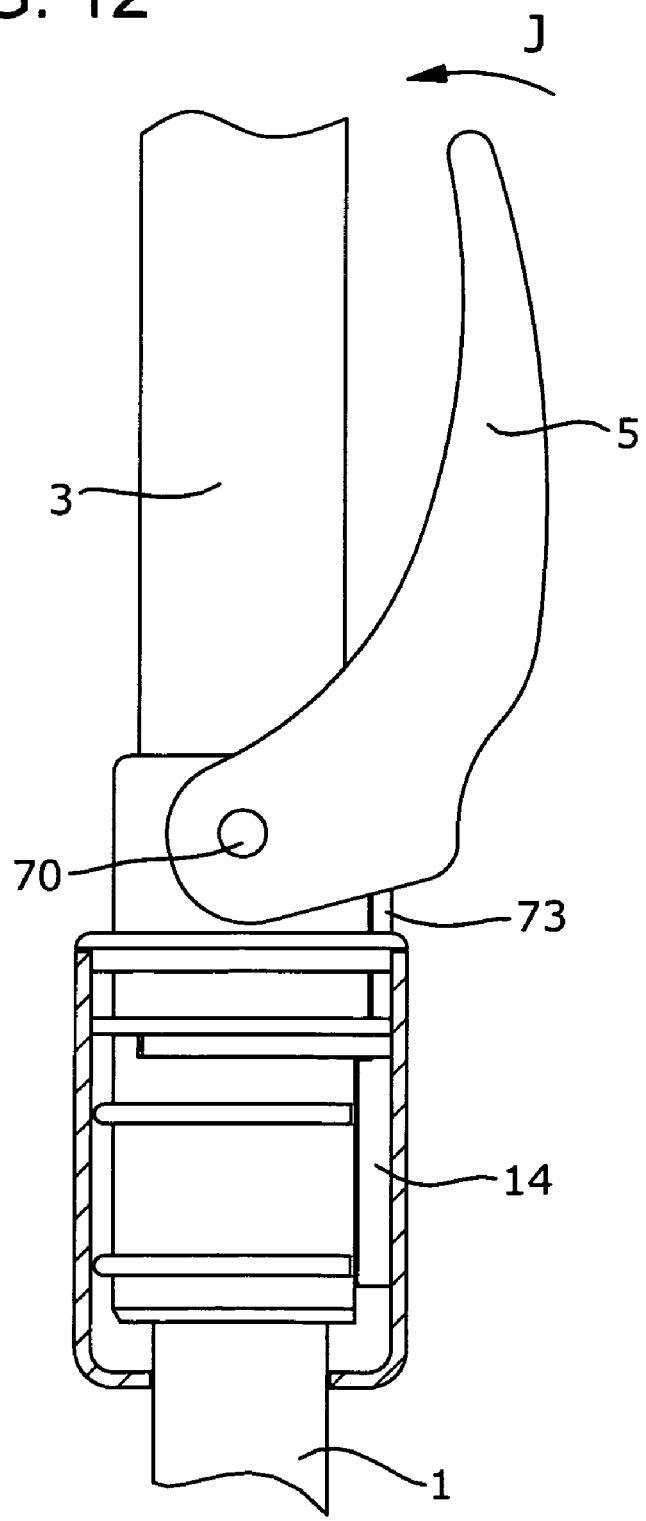
FIG. 12 is & partial view as shown in FIG. 11 in which the device is in an unlocked position.

The invention can be further varied within the scope of the claims as follows: FIGS. 10, 11, 12 show partial views of an embodiment of the invention where the actuating member 7 is omitted. The operating member 5 comprises a U-shaped section which partially surrounds the attachment collar 10 of the locking member 4 with two flanges 61. Holes are arranged in the flanges for trunnion pins 70 that are attached in the envelope surface of the attachment collar 10. These trunnion pins 70 define the center of rotation upon compression of the operating member 5. Furthermore, as previously, two radially displaceable jaws 9 are arranged to be opened under the influence of the wedge 14. The wedge 14 is provided with an upwardly directed extension 73 which engages in a driving slot (not shown) in the interior of the operating member 5. A split washer 72 fulfils the same function as the peg 18 described earlier. The lower part of the locking member 4 is covered by a cap 71, shown in section in FIGS. 12 and 13. The cap fits against the support flanges 73. FIG. 12 shows the locking device in disconnected position. The operating member 5 has been turned about the trunnion pins 70 by means of a compressive force J against the outer element 3. The upwardly directed extension 73 of the wedge 14 is thus drawn upwards in the figure and the wedge 14 has thus released the locking device so that the inner element 1 can move freely in relation to the outer element 3.

FIGS. 13 and 14 show another embodiment of the invention. The inner element 1 is here turned to face the operator and the lower end of the outer element 3 forms an attachment for an implement through a hole 2. The locking member 4 is secured in the lower part of the inner element 1 and fitted into the outer element 3. The locking device 4 comprises radially displaceable jaws 9 provided externally with friction pads. These are pressed outwards by spring elements so that the inner element 1 is locked against the outer element 3. Neither the friction pads nor the spring elements are shown in the figure. Influenced by a wedge 14 with two oppositely facing, angled sliding surfaces fitting corresponding oppositely facing sliding surfaces on the inside of each jaw 9. An actuating member 7 is attached to one part of the wedge 14. This actuating member 7 is fitted into the inner element and no space is therefore required for it between the inner and outer elements, thus facilitating assembly. The actuating member 7 is attached by its other end to the operating member 5. When the operating member 5 is moved in the direction of the arrow J, the actuating member 7 is drawn in the direction of the arrow F and the wedge 14 presses the jaws 9 together, thereby releasing the locking member. The locking member 4 may naturally be designed in many ways within the scope of the inventive concept.

FIGS. 15, 16 and 17 show yet another embodiment of the invention. The locking member 4 here comprises a housing 81 in which a locking wedge 82 and a lever 85 are pivotably journalled via pins 83 and 86. Influenced by a spring 84 the locking wedge is pressed against corresponding wedge-shaped grooves in the inner element 1. The locking force can be varied as desired depending on the wedge angle. When the actuating member 7 is drawn in the direction of the arrow F, the lever 85 is turned so that the protruding piece 87 presses down the protruding piece 88 in the locking wedge 82. The locking wedge 82 is thus drawn out of the wedge-shaped slot 80 in the direction of the arrow G, and the inner rod is freely movable in axial direction. This type of locking member 4 can thus also be operated by an operating member at the desired distance.

The inventive concept of operation being performed at a distance from the locking member can naturally be applied to many different types of locks, including shape-dependent locks in accordance with FIG. 18 where a number of rectangular holes 89 are arranged in an axially directed recess in the inner element 1, similar to the wedge-shaped groove 80 in FIG. 17. A pivotable lock catch 82 can cooperate with the desired hole 89 so that stepwise control of the axial position between the inner element 1 and the outer element 3 can be achieved with an arrangement having a lever 85 etc, similar to that shown in FIGS. 15 and 16. This type of lock can be varied in many ways, such as by replacing the holes 89 with grooves produced by a press operation, for instance. The advantage of shape-dependent locks is that they are generally cheaper to manufacture and require considerably less operating force than friction-dependent locks.

Most known locks for telescopically displaceable elements are based on the principle of radially displaceable locking elements applying force on the inner rod.

FIGS. 19–38 show variants on the principle of applying force on the inner rod by means of tangentially displaceable locking elements. The advantage of this is that the locking forces are greater, due to the wedge action, despite relatively small operating force.

FIGS. 19 and 20 show an inner rod 1 surrounded by a locking housing 102 in which locking elements 103 can be displaced tangentially towards the inner rod. Thanks to the angles a wedging action is obtained such that the locking forces $F_L$ are greater than the operating forces $F_M$.

FIG. 21 shows a locking yoke 112 having locking surfaces 103. The locking yoke is inset in a recess in an outer rod 102. The inner rod is thus locked against the locking surfaces 103 and the opposing inner surface of the outer rod when the locking yoke 112 is moved to the left in the figure.

FIG. 22 shows a locking yoke 112 based on the same principle as in FIG. 21. The locking yoke is operated by a knob 115 with an inclined contact surface against the outer rod.

FIGS. 23 and 24 show the outer rod of a section with integrated locking element 103. The inner rod is pressed against the locking surfaces by the inclined contact surface of the operating knob 115 via recesses 113 in the outer rod.

FIG. 25 shows the contact surface of the knob 115.

Figure 26:
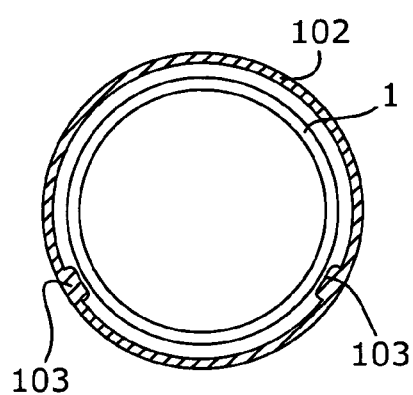
FIG. 26 is a cross-sectional of an inner element and an outer element where the outer element has integrated locking elements.
Figure 27:
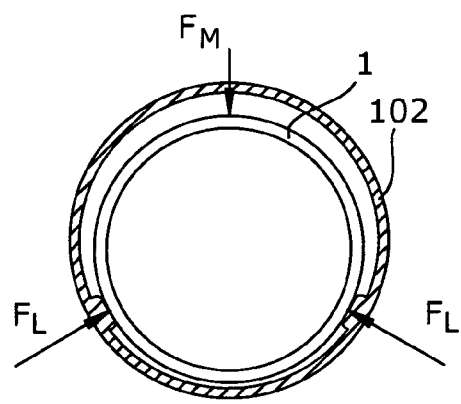
FIG. 27 is a cross-sectional view of the arrangement shown in FIG. 26 where the inner element is locked to the outer element.
Figure 28:
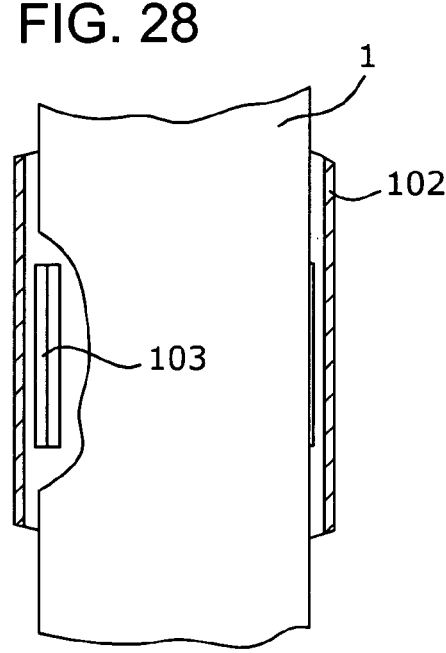
FIG. 28 is a partial cross-sectional side view of the arrangement shown in FIG. 26.

FIGS. 26–28 show an outer rod 102 with integrated locking elements 103.

Figure 29:
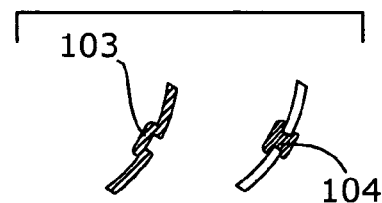
FIG. 29 is a cross-sectional view of different embodiments of the locking elements in the outer element.

FIG. 29 shows how the locking elements 103 can be pressed/embossed directly in the outer rod or shaped as separate elements 104 in a different material, e.g. rubber which can be inserted into grooves punched out in the outer rod.

Figure 30:
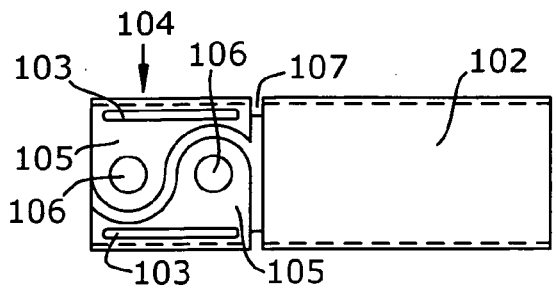
FIG. 30 is a front side view of an outer element that has flaps punched out.
Figure 31:
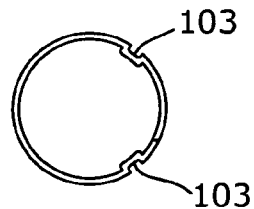
FIG. 31 is a left view of the outer element shown in FIG 30.
Figure 32:
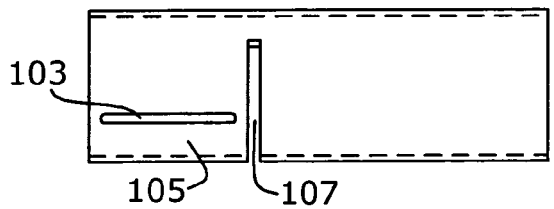
FIG. 32 is a side view of the outer element shown in FIG 30.

FIGS. 30–32 show an outer rod with a part 104 having flaps 105 punched out. Locking elements 103 are pressed into these and operating holes punched out.

Figure 33:
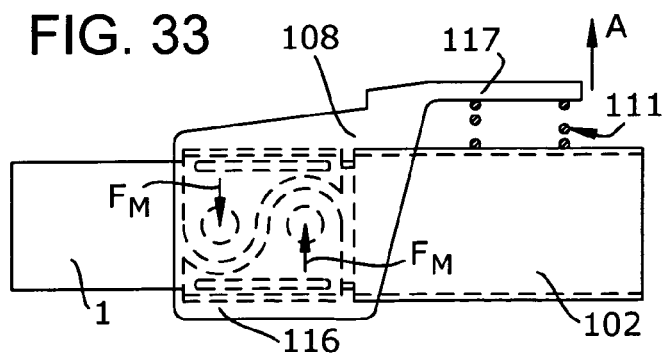
FIG. 33 is a front view of the outer element shown in FIGS. 30–32.
Figure 34:
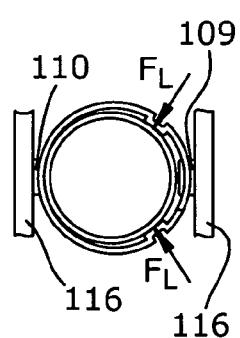
FIG. 34 is a left view of the device shown in FIG. 33.
Figure 35:
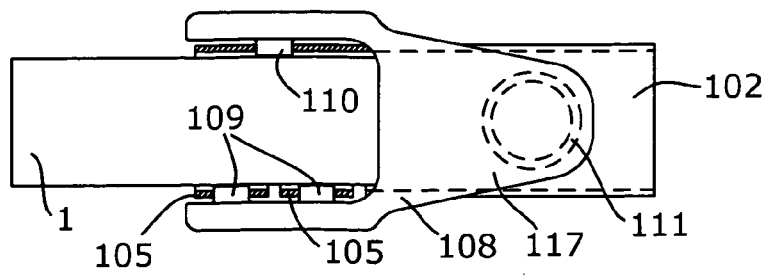
FIG. 35 is a side view of the device shown in FIG. 33.

FIGS. 33–35 show a locking device with outer rod 102 as shown in FIGS. 30–32, an inner rod 1 and an operating member 108 with lever 117. The operating member 108 is provided with two pins 109 operating in holes 106. The pins 109 are located on one flange 116 of the member 108. On the opposite flange is a guide pin 110 that operates in a guide hole in the outer rod. A compression spring 111 is tensioned between the outer rod 2 and the lever 117. The operating member 108 is moved in the direction of the arrow A, whereupon the flaps 105 are drawn towards each other by the pins 109 and the locking elements 103 are pushed in tangential direction towards the inner rod which is thus clamped with considerable force. The lock is opened by pressing the lever 117 of the locking device towards the outer rod.

Figure 36:
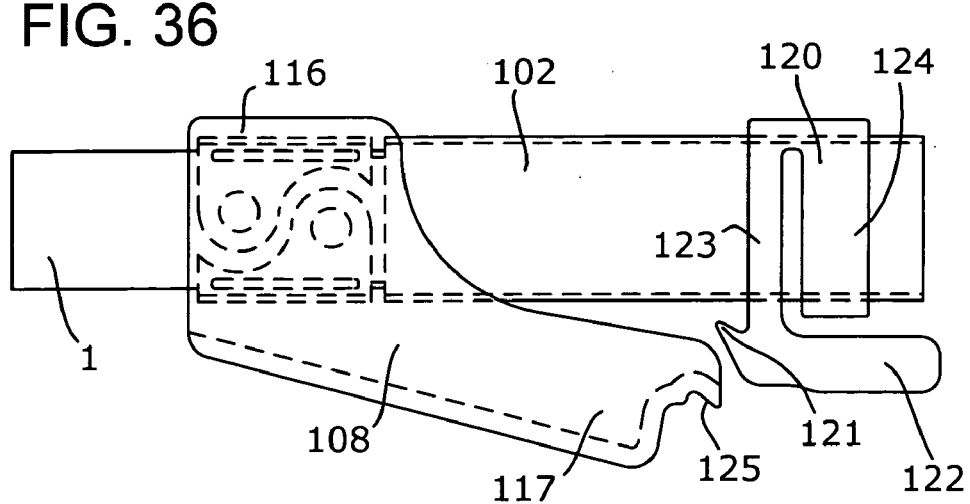
FIG. 36 is a front view of an alternative embodiment.
Figure 37:
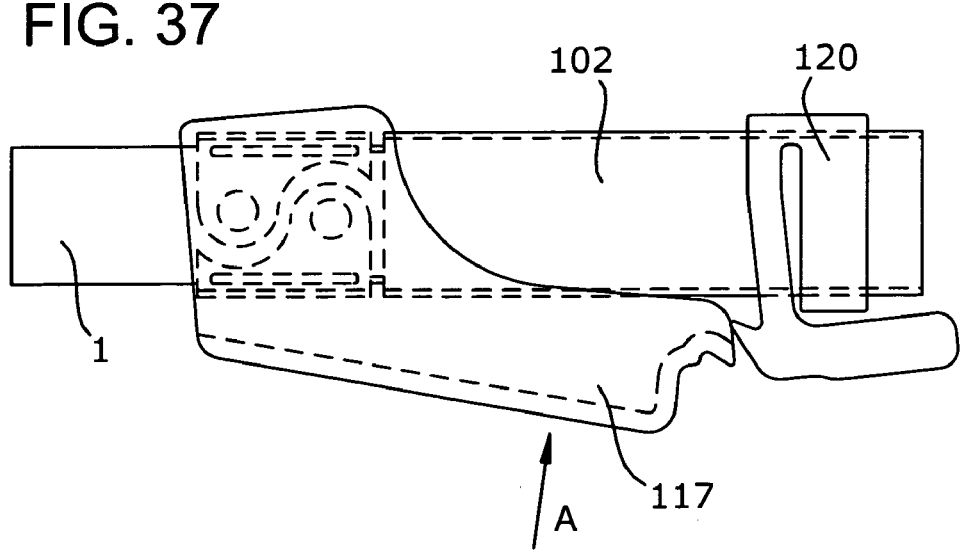
FIG. 37 is a front view of the embodiment shown in FIG. 36 where the operating member is pressed to lock the inner element relative the outer element.
Figure 38:
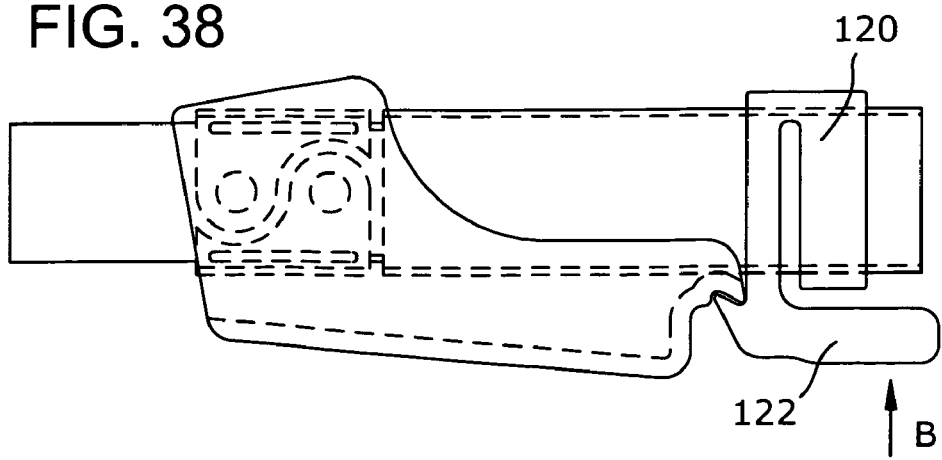
FIG. 38 is a front view of the embodiment shown in FIG. 36 where the operating member is blocked in a locked position.

FIGS. 36–38 show an alternative embodiment of the device illustrated in FIGS. 33–35. In FIG. 36 the operating member is in unlocked position and the inner rod 1 can move freely in relation to the outer rod 102. The operating member 108 is connected as above to the outer rod 102 via pins acting in operating holes. When the lever 117 of the operating member 108 is pressed in the direction of the arrow A, the inner rod 1 is clamped tightly in the same way as above. Operation of the blocking member 120 blocks the operating member in locked position. The blocking member comprises a catch 121 and spring flaps 123, one of each side of the outer rod, which are attached on a tubular part 124 surrounding the outer rod. The blocking member 120 also comprises an operating lever 122. The blocking member, like the operating member, is suitably manufactured from injection-moulded reinforced plastic. A spring function is thus easily achieved in the flaps 123. This blocking member many be designed in many ways. It may, for instance, be provided with several catches permitting selection of the desired locking force. However, it is desirable for a locked position to give sufficient locking force regardless of normal variations in rod dimensions. This is enabled by the elasticity of the punched flaps 105 so that a certain resilience arises that prevents any variations in rod dimensions from affecting the locking function. The lock is easily opened by pressing the operating lever 122 in the direction of the arrow B. This embodiment has the advantage of requiring little space in its normal, locked position since the operating lever 108 is pressed against the outer rod.

Figure 39:
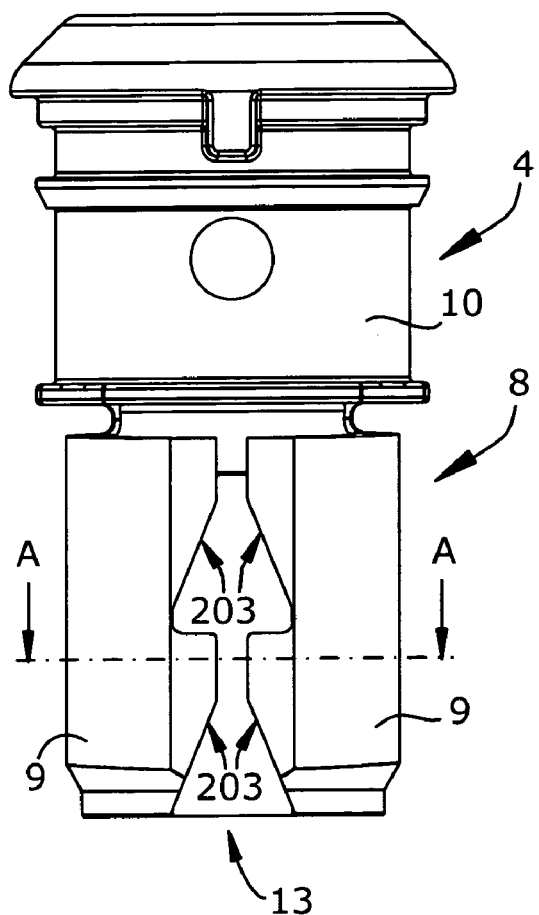
FIG. 39 is a front view of a looking member.
Figure 40:
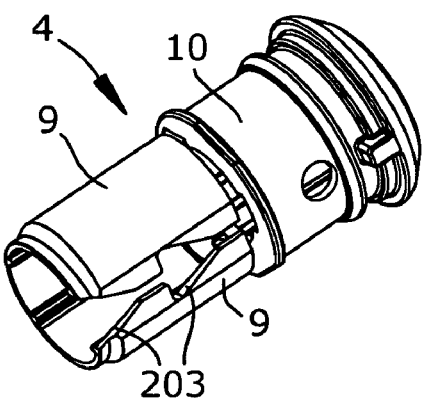
FIG. 40 is a perspective view of locking member shown in FIG. 39.
Figure 41:
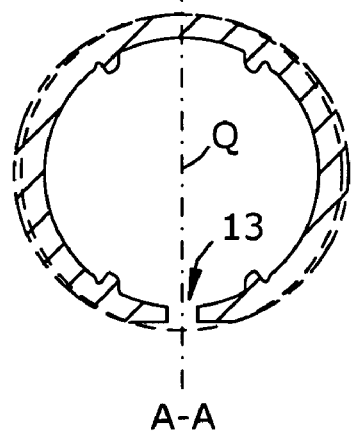
FIG. 41 is a cross-sectional view along the lines A—A of the locking member shown in FIG. 39.
Figure 42:
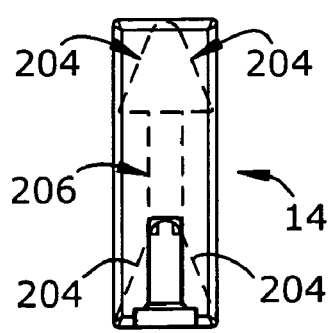
FIG. 42 is a front view of a wedge.
Figure 43:
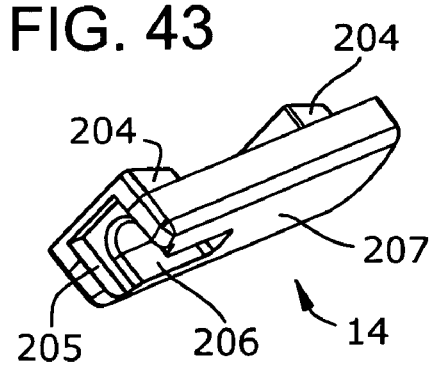
FIG. 43 is a perspective view of the wedge shown in FIG. 42.
Figure 44:
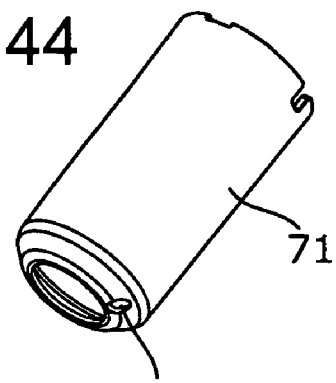
FIG. 44 is a perspective view of a cap.
Figure 45:
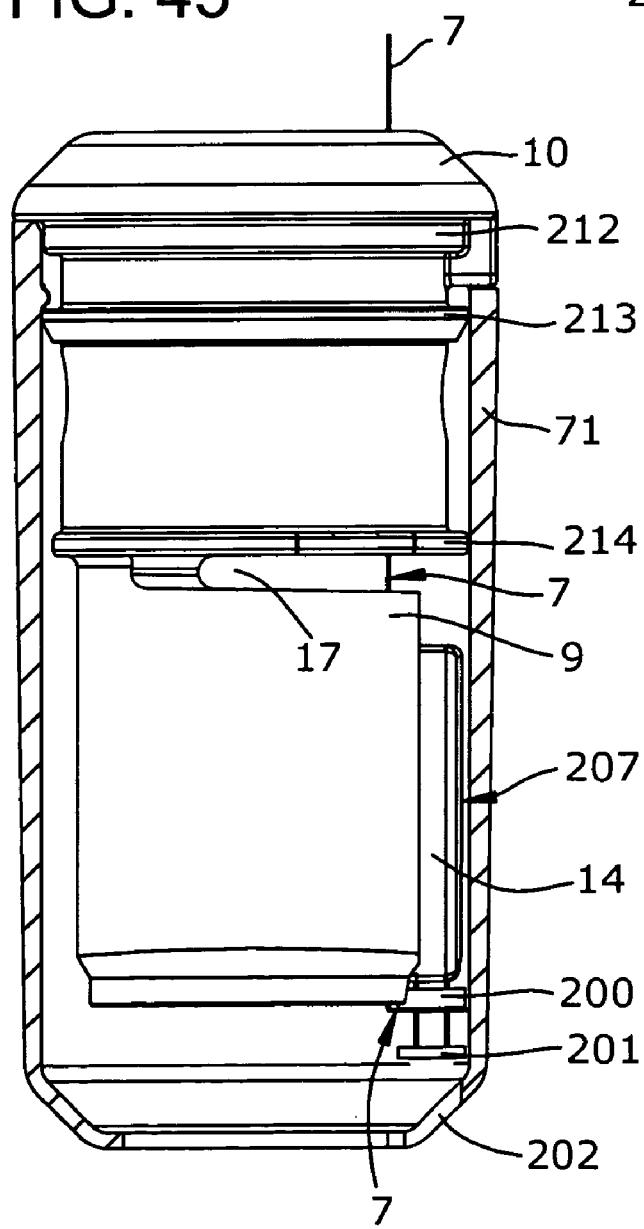
FIG. 45 is a side view of the locking member, wedge, cap and actuating member in an assembled position.

FIGS. 39–46 show preferred embodiments of components of the invention, in which, FIG. 39 illustrates a locking member seen from the front, FIG. 40 illustrates the locking member in accordance with FIG. 39 seen in perspective, FIG. 41 illustrates a cross-section through the locking member in accordance with FIG. 39 along the line A—A, FIG. 42 illustrates a wedge seen from the front, FIG. 43 illustrates the wedge in accordance with FIG. 42 seen in perspective, FIG. 44 illustrates a cap seen in perspective, FIG. 45 illustrates locking member, wedge, the cap in section, and actuating member when assembled, FIG. 46 illustrates operating member, actuating member and wedge, with the operating member in section.

The function of the embodiment of the locking member 4 in FIGS. 39, 40 and 41 is particularly good. The upper part comprises an attachment collar 10 as previously. The lower part 8 comprises two jaws 9, the inner surface of which shall be provided with friction pads 12 and the outer surface of which constitutes a support surface for spring elements 11. These components 12 and 11 are not shown in the figures but preferably consist of self-adhesive rubber sheet and split rings of spring steel, respectively, as described earlier. It is particularly favourable for the support surfaces of the jaws 9 for these spring steel rings 11 to be slightly elliptical as shown in FIG. 41 so that the small axis Q of the ellipse runs through the wedge-shaped groove 13 and thus through the open part of the steel rings 11. Such a design allows the pressure from the spring elements 11 to be distributed uniformly across the circumference and the locking effect is therefore greater since a greater area of the rubber sheet 12 is engaged. It is also favourable to have a relatively large wedge angle in the groove 13 since less of the operating force is then required to overcome the friction and the degree of efficiency is therefore greater. However, a larger wedge angle also means that the length of the wedge will be less since the steel rings 11 must encompass a larger part of the envelope surface of the jaws in order to obtain the required locking force. A satisfactory opening function also requires the separating force from the wedge 14 to be distributed over as long an axial distance on the jaws 9 as possible. This problem is solved with an embodiment in which the separating force is achieved by two or more wedge elements. The figures show how the groove 13 has been provided with two pairs of facing wedge surfaces 203 with relatively large wedge angle, so that the separating force on the jaws 9 is distributed over a longer axial distance that would have been possible with one wedge element and one pair of wedge surfaces. A wedge 14 as shown in FIGS. 42 and 43 is provided on its lower side with two wedge elements having two pairs of outwardly facing wedge surfaces 204. These wedge surfaces cooperate with the wedge surfaces 203 of the groove 13 when the wedge 14 is displaced upwards in axial direction and extremely good opening function is achieved. FIGS. 42 and 43 also show a nut recess 205 for receiving a square nut and a helicoidal groove 206, said helicoidal groove 206 running through the wedge 14 from the nut recess 205 up to the upper wedge element in axial direction. The helicoidal groove 206 is open at the top in its lower part of the wedge and open at the bottom in its upper part. These two grooves 205 and 206 in the wedge 14, together with a combination of screw and nut, enable the position of the wedge to be adjusted to suitable engagement with the groove 13 in the locking member 4, as will be described in more detail below.

FIG. 44 shows a cap 71 designed to be fitted over the locking member 4. The main function of the cap 71 is to protect the locking device with its cooperating parts, but also to give the construction a better design. The cap 71 also has an important function in supporting the wedge 14 so that it cannot fall out of the groove 13. This is shown in FIG. 45 where the cap 71 is shown in section, fitted onto the support rings 212, 213 and 214 of the attachment collar 10. The inner surface of the cap 71 thus supports the outer surface 207 of the wedge 14 with a certain clearance so that the wedge 14 can slide axially in the groove 13 without falling out of the groove. The advantage of this is that the wedge 14 may have much simpler geometry since no outwardly facing guide edges 22 as in FIG. 3 are needed. FIG. 45 shows an actuating member 7 in the form of a steel tape with a hole in the lower part, passed over a screw 201. The actuating member 7 is bent over a nut 200, the nut being screwed onto the screw 201 and fitting partially into the nut recess 205. The screw 201 is inserted into the groove 206 in the wedge 14 as described earlier, and rests against an edge in the bottom of the hole. Turning the screw 201 causes the nut 200 to move in axial direction since the nut recess 205 and actuating member 7 prevent the nut from rotating with the screw. The cap 71 is provided with a hole 202 where a screwdriver can be inserted for adjustment of the screw 201. This arrangement allows the position of the actuating member 7 to be easily changed in relation to the wedge and the wedge 14 can be adjusted to suitable engagement with the groove 13. For the sake of clarity the washer 72 to be fitted into the groove 17 has not been shown in FIG. 45, nor the inner and outer elements.

FIG. 46 shows how the wedge 14 cooperates with the operating member 5 via the actuating member 7. The operating member, shown in cross-section, is suspended in a shaft 26 threaded through holes in the outer element 3. The operating member is partially inserted into the groove 209 in the outer element. The lower part of the operating member is provided with a hole for the shaft 26, said hole defining the center of rotation. Above the hole the operating member has a curved, outwardly directed surface 211 with large radius, for receiving the upper part of the actuating member 7. This actuating member 7 is provided with a hole in its upper part for the screw 208 which is screwed into a corresponding hole in the operating member. To disconnect the lock the gripping surface of the operating member 5 is pressed against the outer element 3 in the direction of the arrow J. The screw 208 is thus rotated and the actuating member 7 is drawn upwards in the direction of the arrow F so that its upper part is bent over the surface 211. Since this has a large radius, no damaging bending stresses occur in the actuating member 7. When the actuating member 7 is drawn in the direction of the arrow F, the wedge 14 is drawn in the same direction and the jaws 9 of the locking member 4 are separated due to the action of the wedge surfaces 204 and the lock is released as described earlier. By turning the screw 201 the position of the wedge 14 in relation to the actuating member can be altered in the direction of the arrow P as described earlier.

This arrangement with a pulling actuating member is advantageous since it can be in the form of a thin tape with no buckling problems. It can also easily be adjusted to a suitable tension through the above design. An actuating member protruding in the form of a rod having a cross-section that will withstand buckling is also possible, or a rod in a supporting groove. This supporting groove may be integrated with the outer element and possibly be half-open, with the opening towards the inside or the outside of the outer element. Such an outer element can easily be manufactured in the form of an aluminium section. However, it is inevitable that a protruding actuating member 7 will require more material and more space, at least with the preferred types of lock where relatively great forces are transmitted.

If shape-dependent lock types are to be used, as in FIG. 18, for instance, a protruding actuating member might be preferably since the operating forces may then be considerably lower.

The embodiments with pulling or pushing actuating members have in common that the actuating member 7 is displaceable along the longitudinal axis of the outer element 3.

It is also possible for the operating force to be transmitted by the actuating member being turned about a shaft parallel with the longitudinal axis of the outer element 3. The actuating member might then be a round rod inserted in a groove in the outer element, or a pipe between the inner element 1 and the outer element 3.

Common to these variants of the invention is that the outer element 3 is provided at one end with a locking device 4 and an operating member 5 spaced from the locking device 4 towards the other end of the outer element.

The invention claimed is:

1. A locking device comprising:
    an inner element and an outer element, the inner element having a lower free end being extendable and axially movable from a first end of the outer element in a first direction, the inner element being slidable inside the outer element, a locking member for looking the inner element relative to the outer element,
    an actuating member connected to a looking engagement device, the locking engagement device being in operative engagement with the locking member, the actuating member extending in a second direction away from the first end of the outer element towards a second opposite end of the outer element, the actuating member extending along the outer element, the second direction being opposite the first direction, an operating member in operative engagement with the actuating member and remote from the locking member, the locking member being operable by the operating member via the actuating member,
    the actuating member being displaceable along, or turnable about, an axis substantially parallel with a longitudinal axis of the outer element,
    the locking member having a locking surface to engage the inner element, the locking surface being fixed in an axial position relative to the outer element so that the locking surface is axially non-movable in the second direction relative to the outer element,
    the locking engagement device being axially movable relative to the inner and the outer elements,
    the locking surface having an effective diameter that increases when the locking engagement device engages the locking member and decreases when the locking engagement device disengages the locking member, and
    the inner element having a fastening device adjacent to the lower free end of the inner element for attaching a tool to the fastening device.

2. A locking device as claimed in claim 1, wherein the actuating member comprises a tape.

3. A locking device as claimed in claim 1, wherein the actuating member is made of steel.

* * * * *